United States Patent [19]

Anand

[11] 4,043,771
[45] Aug. 23, 1977

[54] METHOD OF AND APPARATUS FOR THE DISSOLUTION OF GASES IN LIQUIDS

[75] Inventor: Satish Kumar Anand, Deisenhofen, Germany

[73] Assignee: Linde Aktiengesellschaft, Wiesbaden, Germany

[21] Appl. No.: 660,511

[22] Filed: Feb. 23, 1976

[30] Foreign Application Priority Data

Feb. 22, 1975 Germany .............................. 2507698

[51] Int. Cl.[2] ........................ B01D 47/02; C02C 1/02; C02C 5/02; C02C 5/10
[52] U.S. Cl. ..................................... 55/93 BN; 55/95; 55/223; 55/256; 261/77; 261/117; 261/36 R; 261/DIG. 75; 210/14; 210/15; 210/63 R; 210/219; 210/220
[58] Field of Search ........................ 55/39, 53, 196, 93, 55/95, 223, 256; 210/3, 7, 15, 63 R, 197, 14, 219, 220, 221 R; 261/66, 77, 117, 36 R, 121 R, 122, DIG. 75

[56] References Cited

U.S. PATENT DOCUMENTS

| 950,999 | 3/1910 | Erlwein | 261/DIG. 75 |
|---|---|---|---|
| 1,734,011 | 10/1929 | Harrison | 210/15 |
| 2,081,029 | 5/1937 | Young | 261/117 |
| 3,439,807 | 9/1966 | Danjes | 261/122 |
| 3,503,593 | 3/1970 | Nelson | 261/DIG. 75 |
| 3,643,403 | 2/1972 | Speece | 55/196 |
| 3,724,667 | 4/1973 | McKinney | 210/197 |
| 3,725,258 | 4/1973 | Spector | 210/15 |
| 3,772,187 | 11/1973 | Othmer | 210/7 |
| 3,789,578 | 2/1974 | Askew | 55/39 |
| 3,933,640 | 1/1976 | Kirk | 210/197 |
| 3,953,003 | 4/1976 | Schreiber | 261/121 R |

FOREIGN PATENT DOCUMENTS

| 1,201,365 | 9/1965 | Germany | 55/39 |
|---|---|---|---|
| 308,254 | 6/1930 | United Kingdom | 261/DIG. 75 |

Primary Examiner—Thomas G. Wyse
Assistant Examiner—Ernest G. Therkorn
Attorney, Agent, or Firm—Karl F. Ross; Herbert Dubno

[57] ABSTRACT

Liquids, e.g. sewage sludge, waste water or oxygen-poor natural water, are treated with gas for enrichment (especially oxygenation) by forcing the liquid downwardly through a perforated wall in a vessel containing the liquid. The perforated partition subdivides the liquid forced downwardly through the column into a plurality of partial streams which open into a gas space above the downwardly moving column of liquid in the melt. Bubbles of the gas, e.g. oxygen, pass upwardly through the column of liquid in the shaft.

7 Claims, 4 Drawing Figures

METHOD OF AND APPARATUS FOR THE DISSOLUTION OF GASES IN LIQUIDS

FIELD OF THE INVENTION

The present invention relates to a method of and an apparatus for the gas treatment of liquids in a liquid column moving downwardly, in a vessel containing the liquid, against rising bubbles of the gas.

BACKGROUND OF THE INVENTION

The gasification of liquids, i.e. the treatment of liquids with gases to dissolve soluble gases in the liquid, is carried out for various purposes, especially for the oxygenation of oxygen-poor liquids, for example, waste water or sewage, oxygen-poor natural water and the like. The oxygenation promotes bacterial action causing decomposition of organic materials and generally improving the liquid. In the treatment of sewages using the oxygenation method, oxygenation promotes the formation of sludge which results in bacterial decomposition of organic matter to leave an effluent which is substantially pure and which can be decanted from this sludge. The latter can be disposed of in various ways.

Natural waters likewise may be oxygen-poor and may be incapable of sustaining aquatic life. Accordingly it has been found to be advantageous to oxygenate this water before it is released into a natural water course.

In the gasification of liquids, i.e. the dissolution of gases in liquids, it is known to improve the residence time or contact time of the gas with the liquid by forming gas bubbles in a column of the liquid which is forced downwardly and thereby circulated within a vessel containing the liquid to be treated. Since the gas bubbles tend to rise in the column, because of their low specific gravity, the downward flow of the column tending to entrain the bubbles downwardly, can promote a long duration of contact between the gas and the liquid. The rate at which the gas rises in the column can be controlled by variation in the velocity of the downward flow of liquid within the column. This technique has been used principally in processes for the oxygen-enrichment of prepurified waste waters.

Especially in large vessels for the oxygenation of waste waters, e.g. in large-scale sewage treatment plants and waste-water treatment facilities, the oxygen consumption and the energy consumption necessary to introduce a particular concentration of soluble oxygen in the liquid are both limited. In other words, there is a maximum solubilization rate for the oxygen and this together with the waste water throughput must be considered when economic operation of the plant is desired.

In a conventional plant, for example, an increase in the throughput of the liquid may reduce the duration of contact of the oxygen with the liquid phase and hence the rate of solubilization. On the other hand, an increase in the gas supply to the liquid within a circulating column within a vessel may not result in an increase in soluble oxygen within the liquid. Furthermore, increased flow rates of the liquid result in increased consumption of energy for accomplishing the higher liquid velocity and hence excessive energy consumption for a given oxygenation of the liquid phase.

Investigations have demonstrated that increased liquid flow velocities in a gasification column sharply decrease the quantities of soluble gases per unit power consumption (kg of gas dissolved per kw hour of energy consumed).

OBJECT OF THE INVENTION

It is the principal object of the present invention to provide a method of and an apparatus for the dissolution of gases in liquids which eliminates the aforementioned disadvantages.

Another object of the invention is to provide an improved method of solubilizing gases in liquids which provides an increased content of soluble gas per unit energy consumed.

Still another object of the invention is to provide an apparatus for the purposes described which is more efficient in terms of gas dissolved per unit of energy consumed.

SUMMARY OF THE INVENTION

These objects and others which will become apparent hereinafter are attained, in accordance with the present invention, is based upon my discovery that the solubilization of oxygen in a liquid, especially waste water, or more generally the solubilization of gas in a liquid, can be sharply increased for a given energy consumption when the liquid stream is subdivided into a plurality of partial streams within a gasification column of a vessel and wherein the partial streams are introduced into a gas compartment which is bounded on the bottom by the liquid level in the column, the partial streams being sprayed into this compartment and onto the body of liquid within the column.

More specifically, I have found that the gasification of a liquid, i.e. the solubilization of gases in a liquid, can be increased by circulating the liquid in a vessel through a column therewithin, maintaining a gas compartment above the liquid level in this column and forcing the liquid stream, as sprays or partial streams, through a perforated plated bounding the top of this compartment into the column.

By spraying the liquid into the gas compartment and onto the liquid level defining the bottom thereof, the mixing of the liquid with the gas is made substantially more intensive than has been achieved by the simple circulation of liquid through the column. This more intensive mixture of a liquid with a gas is accomplished with only minor increases in energy consumption and hence the overall ratio of oxygen dissolved to unit energy consumption is increased.

Furthermore, I have found that the spray technique and subdivision of the liquid phase into a multiplicity of partial streams introduced into the compartment in the form of sprays, sharply increases the foaming above the liquid level in the column and thereby maintains the gas in contact with the liquid phase for a longer period. The solubilization speed of the gases in the liquid is substantially increased.

Because the liquid stream is sprayed into the gasification column not in a single spray from a single nozzle, but in a multiplicity of sprays from a plurality of nozzles or orifices in a multiplicity of partial streams, the flow velocity of the individual partial streams can be maintained relatively low. In tests made with water and oxygen, this reduction of the flow velocity has been found to be one-fourth of the flow velocity for a pump of given capacity which, in turn, corresponds to a threefold to tenfold increase in the oxygen solubilized in the gas per unit of energy consumed. It has been found to be especially effective to provide flow velocities in the passages of the plate (flow velocities of the partial streams) of about 2 – 4 m/sec. Because of the reduction of the flow velocity, the gas losses, i.e. the quantities of gases which pass from the liquid and are not solubilized therein, are significantly reduced.

Overall, the method of the present invention results in a gasification of a given quantity of fluid in a shorter time than has hitherto been the case with reduced energy consumption and reduced gas losses.

A further improvement in the process according to the present invention in obtained when the gas space is not directly supplied with the gases but is fed with a portion of the gas only in the form of gas bubbles which are delivered to the column of liquid at the bottom thereof. In other words, the gases which enter the gas space emerge from the liquid in the form of gas bubbles rising therein.

To this end, the gas-supply device is provided at the lower end of the gasification column, preferably in the form of a perforated gas distributor. Thus at least a part of the gas supplied to the gasification column is solubilized in the column of liquid between the bottom thereof and the liquid level which defines the bottom of the gas compartment. The gases are thus partially solubilized as they rise within the column before they reach the gas compartment.

Advantageously, the flow velocity of the liquid in the column, i.e. the continuum of liquid therein, is controlled to minimize the quantity of gas which reaches the gas space. In other words, the velocity of liquid in the column is maintained at a level sufficient to entrain most of the gases with the liquid or to hold the gas bubbles in the column and prevent at least the major part of the gas which is introduced into the column from eaching the gas space. Only a quantity of gas need be admitted to the compartment to balance the gas absorbed therein by the liquid. The size of the compartment should thus be maintained in a steady state, i.e. without change in volume. Furthermore, the flow velocity may be controlled so that only a minor quantity of unsolubilized gas is entrained with the liquid out of the bottom of the column. As a result substantially all of the gas is eventually solubilized in the liquid phase.

It has been found that, especially for the biological treatment of waste waters, it is not necessary to increase the oxygen concentration above a predetermined level. In other words, further enrichment with oxygen may be useless. Accordingly, I provide means whereby a portion of the liquid at least can be passed through the column without being sprayed into a gas chamber. In this way it is possible to maintain a circulation of the liquid without necessarily charging a portion of it with additional gas. This permits the gas solubilization and circulation of the liquid to be controlled independently of one another.

According to the apparatus aspects of the invention, the means for carrying out the present process comprises a vessel provided with a gasification column beginning below the surface of the liquid in the vessel and terminating above the bottom thereof, the gasification column occupying only a minor portion of the volume of the vessel and being provided with a partition across the flow cross section, the partition having passages in spaced-apart relation for the liquid.

At the bottom of the column, a gas-supply device is provided and means, e.g. a pump located at the head or mouth of the column, can be provided to displace the liquid through the perforated partition and the column.

It has been found to be advantageous when the passages in the partition are spaced apart by a distance of about twice their diameter. In other words, the spacing between nearest-neighbor orifices is twice the diameter of the orifices themselves. With this spacing of the flow passages which subdivide the liquid stream into partial streams, I have found the partial streams capable of being sprayed into the gas-containing compartment to be an optimum since interference between the streams is minimized. The partial streams can move at minimum velocity and hence the total flow throughput of the liquid can be relatively large with relatively slow speeds and large quantities of liquid can be treated in short periods of time.

According to a feature of the invention, the gasification column is provided with a bypass tube or duct which opens at the aforementioned partition and extends downwardly in the column to terminate below the liquid level therein, i.e. below the bottom of the gas space, this duct being formed with a movable closure member at its mouth whereby the duct can be opened to allow the bypass of a portion of the liquid without traversing the gas column. The closure member can be operated automatically when the concentration of gases in the liquid reaches the desired level. Alternatively, it may be operated manually when the proper gas concentration is detected in the liquid.

It has also been found to be desirable in some cases to permit gas to be vented from the gas compartment. According to the invention, therefore, I can provide a gas outlet located below the perforated partition but above the liquid level in the column and can connect this outlet with a compressor which has its output side communicating with the gas distributor at the bottom of the column for circulating gas from the compartment to the distributor. This has been found to be significant because, in general, the quantity of gas traversing the column is greater than the quantity of gas which is absorbed by the liquid per unit time. The recirculation permits the gas compartment to be maintained at a predetermined volume.

To prevent the compartment from reducing in volume as the gas is circulated, I may provide a fresh-gas inlet which communicated with the distributor as well. To adjust the volume of the gas compartment I have found it to be desirable to provide a valved vent which can discharge gas into the atmosphere. This allows venting not only of excess oxygen, in the case of wastewater treatment, but also of accumulated gases such as carbon dioxide which may be detrimental to the biological process. To present carbon dioxide from being recirculated with the oxygen, there may be provided ahead of the compressor a device for purifying the gas, e.g. a cell to absorb it.

BRIEF DESCRIPTION OF THE DRAWING

The above and other objects, features and advantages of the present invention will become more readily apparent from the following description, reference being made to the accompany drawing in which.

SPECIFIC DESCRIPTION

Figure 1:
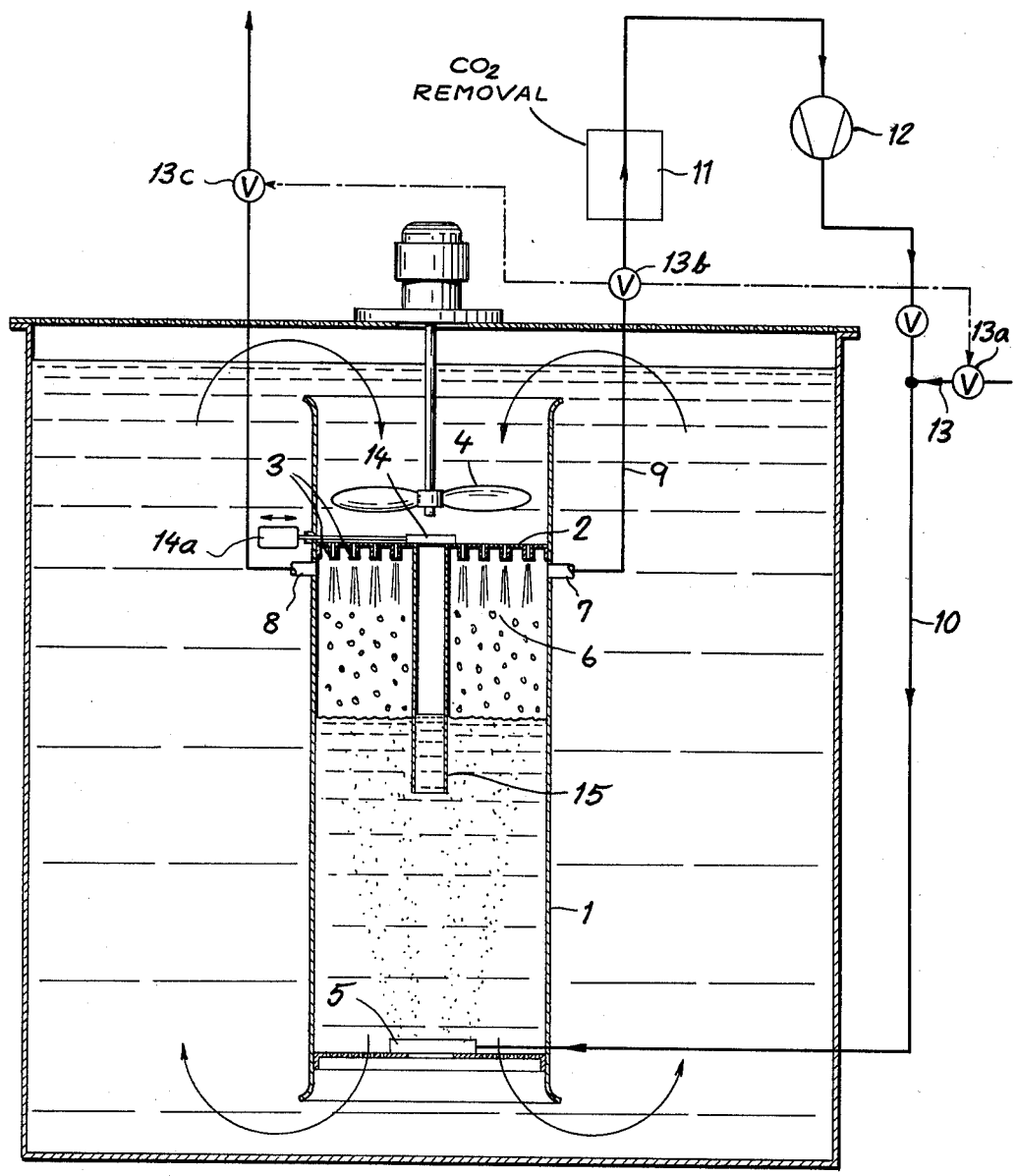
FIG. 1 is a diagrammatic vertical section through a gasification system according to the present invention.

FIG. 1 shows schematically a gasification device according to the present invention especially designed for the oxygen-enrichment of waste waters. The term "waste water" is intended to include not only sewage or prepurified industrial wastes, but also highly contaminated oxygen-poor natural water which may be drawn from a water course and returned thereto.

The apparatus comprises a vessel in which a gasification duct 1 is provided to form a water column. The column is formed with a partition 2 provided with a multiplicity of passages 3 in the form of nozzles which extend substantially vertically and perpendicular to the column. The upper end of the column 1 is disposed below the upper surface of the water in the surrounding vessel while the lower end of the column terminates above the bottom of the vessel.

A pump 4 has its blade disposed within the column 1 directly above the partition to force water downwardly through the perforations in the latter. This downward movement of water in the column circulates the water within the vessel as represented by the arrow.

Disposed upon a perforated plated at the bottom of column 1 is a gas distributor 5 which may be of porous stone or a porous-wall compartment capable of discharging the gas in the form of small bubbles which rise in the column. The distributor 5 constitutes a gas supply means at the bottom of the column.

As the gas bubbles rise in the liquid within the column, a portion of the gas is absorbed or solubilized. The balance rises to a gas space or compartment 6 directly below the partition 2, in which the gas is trapped since it cannot pass upwardly through the orifices 3 because of the downward partial streams of liquid emerging therefrom. As a consequence the liquid continuum within the column 1 is pushed downwardly so that a liquid surface defines the bottom of the gas compartment 6.

The size of the gas compartment 6 can be controlled by the displacement pressure of the pump 4 which determines the pressure within the passages 3. A vent 7 opens into the column directly below the plate 2 and can discharge superfluous gas through a gas purifier 11 (e.g. a carbon dioxide absorber) to a compressor 12 which recirculates the gas via a line 10 to the distributor 5. Fresh gas 13 can be added to line 10 under the control of a valve 13a which may operate in response to a pressure detector 13b communicating with the gas compartment 6 so as to automatically add gas should the pressure drop below a predetermined level. Should the pressure within the compartment 6 build up excessively, e.g. as a result of the accumulation of carbon dioxide therein, a valve 13c can be opened by the pressure detector 13b. Valve 13c is in a line which can be connected to a vent opening 8 in the compartment 6. A line 9 connects outlet 7 with the gas purifier 11.

Instead of a pressure regulator 13b it is possible to control the gas supply and venting in accordance with the volume of the compartment 6 in which case a detector is provided for the liquid level within the column.

The column is formed with a duct 15 which opens at the bottom beneath the liquid level and at the top above the partition 1, this duct 15 being closed by a shutter 14 which may be displaced to permit free circulation of liquid without traversing the compartment 6. To this end a controller 14a is provided which responds to the oxygen level in the liquid. When the oxygen concentration is sufficient, the duct 15 is opened to permit liquid circulation through this duct to bypass the gas chamber 6.

Figure 2:
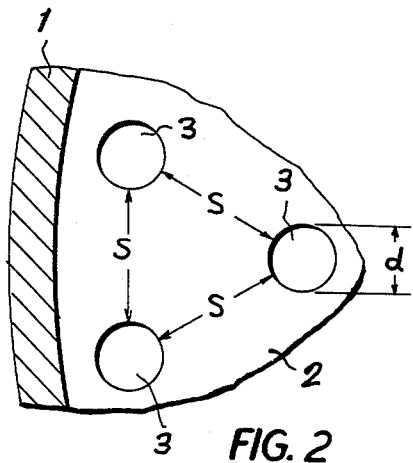
FIG. 2 is a plan view of a portion of the partition according to the invention.

As can be seen in FIG. 2, the passages 3 in the plate 2 are spaced apart by distances S from their nearest neighbors and have a diameter $d$ wherein $S = 2d$.

Figure 4:
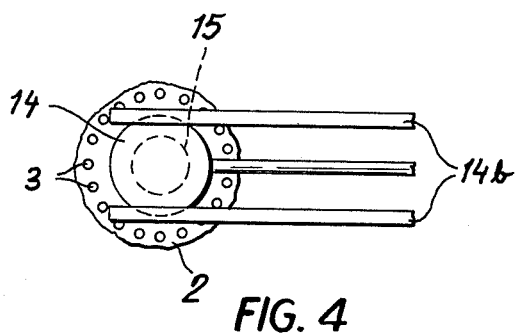
FIG. 4 is a fragmentary plan view of a portion of the partition of FIG. 1.

FIG. 4 shows a pair of guide rails 14b for the closure disk 14 which blocks the duct 15.

Figure 3:
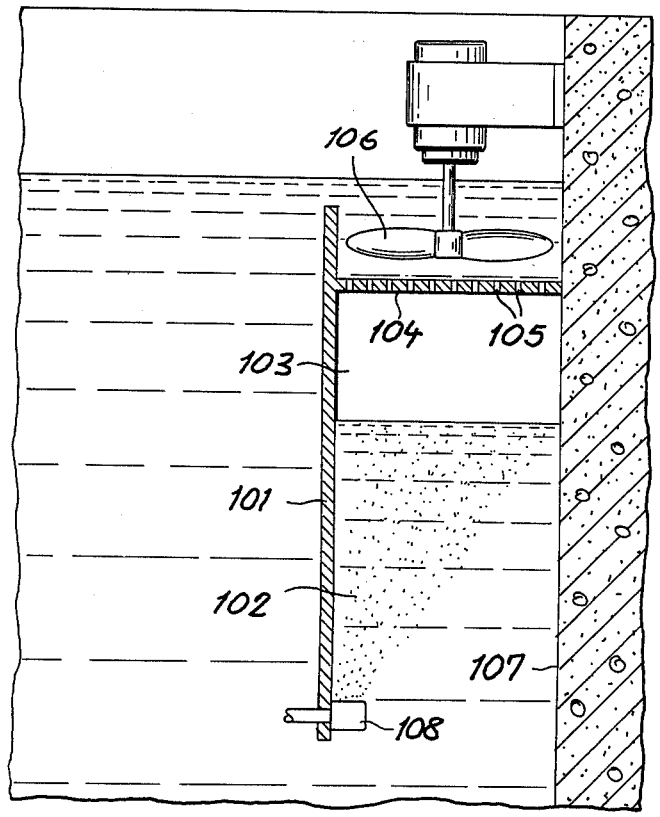
FIG. 3 is a cross-section through another device for carrying out the method of the present invention.

In FIG. 3 we show a modification of the present invention in which the vessel 107 is a sewage treatment tank and the column 101 is formed of rectangular cross section along a wall of this tank. The liquid 102 rises within the column 101 to a level below the partition 104 so as to define the gas compartment 103 therewith. The partition 104 has passages 105 traversed by the liquid which is displaced by a pump 106. A gas distributor 108 is mounted upon the wall of the vessel 107. The device illustrated in FIG. 3 operates in the same manner as the system described in connection with FIGS. 1 and 2.

I claim:

1. A process for the dissolution of gas in a liquid in a vessel, comprising the steps of:
   circulating the liquid through an upright column occupying only a portion of the volume of said vessel;
   subdividing the liquid flow in said column at an upper portion thereof into a multiplicity of partial streams and spraying said streams into a gas space maintained above a liquid level in said column;
   supplying gas to said space for solubilization in the liquid by passing bubbles upwardly through a liquid continuum in said column from the bottom thereof and releasing a portion of said bubbles into said space at said liquid level within said column; and
   maintaining the flow velocity of the liquid continuum in said column at a level sufficient to permit only a portion of the rising gas bubbles in said liquid continuum to reach said gas space.

2. The process defined in claim 1, further comprising the step of conducting at least a portion of the liquid traversing said column through the latter without contact with the gas in said space.

3. An apparatus for solubilizing a gas in a liquid, comprising:
   a vessel containing a liquid;
   a column in said vessel having a mouth opening below the upper surface of the liquid therein and terminating above the bottom of said vessel;
   a distributor disposed at the bottom end of said column for introducing gas bubbles into the liquid within said column at the bottom thereof;
   a partition at an upper portion of said column formed with a plurality of passages for subdividing a liquid traversing the column into a multiplicity of partial streams below said partition;
   a gas space in said column below said partition; and
   pump means for circulating liquid through said passages and said column whereby gas rising from said column forms said gas space into which said streams are sprayed below said partition, said passages in said partitions having mutual spacings approximately equal to twice their diameters.

4. The apparatus defined in claim 3, further comprising venting means for discharging a portion of the gas from said space below said partition.

5. The apparatus defined in claim 4, further comprising recirculating means including a compressor communicating with said vent means and connected to said gas introducing means.

6. The apparatus defined in claim 5 wherein said recirculating means includes a gas-cleaning device.

7. The apparatus defined in claim 3, further comprising a duct opening at said partition and extending through said gas space to terminate below the liquid level in said column, and a closure device for said duct, said duct, upon opening by said closure device, permitting liquid flow through said column without traversing said gas space.

* * * * *